United States Patent [19]
Klopp et al.

[11] Patent Number: 5,569,758
[45] Date of Patent: Oct. 29, 1996

[54] PREPARATION OF METAL-FREE PHTHALOCYANINES

[75] Inventors: Ingo Klopp, Lambsheim; Peter Böttcher, Mutterstadt; Ulrich Frick, Dudenhofen; Otto Schiller, Bobenheim-Roxheim, all of Germany

[73] Assignee: BASF Aktiengesellschaft, Ludwigshafen, Germany

[21] Appl. No.: 356,954

[22] Filed: Dec. 16, 1994

[30] Foreign Application Priority Data

Dec. 17, 1993 [DE] Germany ............ 43 43 302.2

[51] Int. Cl.⁶ .................................. C09B 47/30
[52] U.S. Cl. .................. 540/122; 540/129; 540/131; 540/136
[58] Field of Search ................. 540/122, 130, 540/131, 135, 142, 143

[56] References Cited

U.S. PATENT DOCUMENTS

| | | | |
|---|---|---|---|
| 2,382,441 | 8/1945 | Reynolds et al. | 540/143 |
| 2,485,168 | 10/1949 | Rintelman | 260/314.5 |
| 3,357,989 | 12/1967 | Byrne et al. | 260/314.5 |
| 4,145,264 | 3/1979 | Thoma et al. | 204/74 |
| 5,367,069 | 11/1994 | Beck et al. | 540/122 |

FOREIGN PATENT DOCUMENTS

| | | |
|---|---|---|
| 821518 | 12/1937 | France . |
| 696334 | 9/1940 | Germany . |
| 2218788 | 12/1972 | Germany . |
| 4234922 | 4/1994 | Germany . |

OTHER PUBLICATIONS

*A New Polymorph Of Metal–Free Phthalocyanine* By Shigemasa Takano, et al. Chemistry Letters, pp. 2037–2040, 1984. The Chemical Society of Japan.

Database WPI, Derwent Publications, AN 85–155940, JP–A–6 087 288, May 16, 1985.

*Primary Examiner*—Mukund J. Shah
*Assistant Examiner*—Pavanaram K. Sripada
*Attorney, Agent, or Firm*—Oblon, Spivak, McClelland, Maier & Neustadt, P.C.

[57] ABSTRACT

A process for preparing metal-free phthalocyanines which can carry up to 16 halogen atoms, cyano groups, carboxyl groups, sulfo groups, $C_1$–$C_{18}$-alkyl groups and/or aryl radicals as substituents by reductive cyclization of ortho-phthalodinitrile substituted ortho-phthalodinitriles or mixtures thereof comprises effecting the cyclization in $C_2$–$C_4$-alkylene monoglycols, oligoglycols or polyglycols, their mono-$C_1$–$C_4$-alkyl or -aryl ethers or their mixtures in the presence of an aromatic compound of the formula I

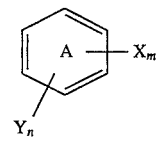

where the substituents X can be identical or different and each denotes hydroxyl, mercapto, amino or $C_1$–$C_6$-alkylamino, the substituents Y can likewise be identical or different and each denotes halogen, $C_1$–$C_6$-alkyl, $C_1$–$C_6$-alkoxy or $C_1$–$C_6$-alkoxycarbonyl, m is from 1 to 4 and n is from 0 to 5, subject to the proviso that m+n $\leq 6$, and the benzene ring A can be fused to a further benzene ring, and of an inorganic base.

7 Claims, No Drawings

PREPARATION OF METAL-FREE PHTHALOCYANINES

The present invention relates to a novel process for preparing metal-free phthalocyanines which can carry up to 16 halogen atoms, cyano groups, carboxyl groups, sulfo groups, $C_1$–$C_{18}$-alkyl groups and/or aryl radicals as substituents by reductive cyclization of ortho-phthalodinitrile, substituted ortho-phthalodinitrile, substituted ortho-phthalodinitriles or mixtures thereof.

Metal-free phthalocyanines are attracting increasing interest for use as pigments for the blue to green sector.

The preparation of metal-free phthalocyanines starting from ortho-phthalodinitriles (o-PDNs) can be effected in a whole series of ways using different reducing agents and bases.

For instance, U.S. Pat. No. 2,485,168 discloses a method of preparation wherein o-PDN is heated with ethylene glycol, piperidine or quinoline and also potassium carbonate in dichlorobenzene or cyclohexanol.

In DE-A-696 334 the metal-free phthalocyanine is synthesized by fusing o-PDN and hydroquinone or glycerol or by heating the reactants in trichlorobenzene.

However, these methods have various disadvantages: a fusion process is difficult to implement on an industrial scale; moreover, the desired product is only obtained in poor yields. Use of the environmentally harmful chlorobenzenes as solvents makes additional measures for their complete removal from the product and the waste water necessary.

As will be known, metal-free phthalocyanine has various crystal forms (The Phthalocyanines, CRC Press Inc., 1983). The literature describes the forms α, β, X and π (π as a mixture with X-H$_2$Pc and π-CoPc; see also U.S. Pat. No. 3,357,989, DE-A-22 18 788) and τ (Chem. Letters 1984, 2037–40). DE-A-42 34 922, which was unpublished at the priority date of the present invention, gives a structural characterization of the γ form in terms of the X-ray powder diagram (CuKα) - 2°θ: 6.8°, 7.4°, 13.6°, 14.9°, 15.9°, 16.9°, 20.5°, 22.4°, 24.7°, 26.2° and 27.8°.

Existing processes only allow the preparation of the β form of metal-free phthalocyanine. A preparative process whereby various crystals forms can be obtained through convenient variation of the experimental parameters does not exist.

It is an object of the present invention to remedy the defects mentioned and provide a technically simple, economical process for preparing metal-free phthalocyanines which also makes possible the specific synthesis of various phthalocyanine phases.

We have found that this object is achieved by a process for preparing metal-free phthalocyanines which can carry up to 16 halogen atoms, cyano groups, carboxyl groups, sulfo groups, $C_1$–$C_{18}$-alkyl groups and/or aryl radicals as substituents by reductive cyclization of ortho-phthalodinitrile, substituted orthophthalodinitrile, substituted ortho-phthalodinitriles or mixtures thereof, which comprises effecting the cyclization in $C_2$–$C_4$-alkylene monoglycols, oligoglycols or polyglycols, their mono-$C_1$–$C_8$-alkyl or monoaryl ethers or their mixtures in the presence of an aromatic compound of the formula I

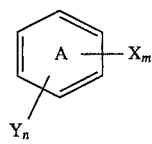 I where the substituents X can be identical or different and each denotes hydroxyl, mercapto, amino or $C_1$–$C_6$-alkylamino, the substituents Y can likewise be identical or different and each denotes halogen, $C_1$–$C_6$-alkyl, $C_1$–$C_6$-alkoxy or $C_1$–$C_6$-alkoxycarbonyl, m is from 1 to 4 and n is from 0 to 5, subject to the proviso that m+n $\leq$6, and the benzene ring A can be fused to a further benzene ring, and of an inorganic base.

The process of the invention is suitable for preparing metal-free phthalocyanines, which generally can carry up to 16, preferably up to 4, identical or different substituents.

Customary substituents are halogen, in particular bromine and especially chlorine, cyano, carboxyl, sulfo, branched or unbranched $C_1$–$C_{18}$-alkyl, in particular $C_1$–$C_6$-alkyl, especially methyl and ethyl, and also aryl, in particular phenyl.

However, the process of the invention is particularly important for unsubstituted metal-free phthalocyanine.

The reducing agents used in the process of the invention are glycols and glycol monoethers and their mixtures, which also act as solvents, making it possible to dispense with the use of other, enviromentally harmful solvents.

Suitable in this connection are not only mono- but also oligo- (in particular di- and tri-) and poly-$C_2$–$C_4$-alkylene glycols ("glycols" for short) and their mono-$C_1$–$C_8$-alkyl and monoaryl ethers ("glycol monoethers" for short). The compounds based on propylene are preferred and the compounds based on ethylene are particularly preferred.

Examples are ethylene glycol, 1,2- and 1,3-propylene glycol, butylene glycols, di-, tri- and tetraethylene glycols, di-, tri- and tetrapropylene glycols, polyethylene and polypropylene glycols, ethylene glycol monomethyl, monoethyl,, monopropyl, monobutyl, and monohexyl ether and propylene glycol monomethyl, monoethyl, monopropyl, monobutyl and monohexyl ether, di-, tri- and tetraethylene glycol monomethyl, monoethyl and monobutyl ether and di-, tri- and tetrapropylene glycol monomethyl, mono-ethyl and monobutyl ether and also ethylene and propylene glycol monophenyl ether.

The amount of reducing agent (and hence of solvent) is not critical as such and is advantageously chosen so that a readily stirrable pigment suspension is present. Generally, a weight ratio of solvent to o-PDN of from 20:1 to 1:1 is suitable, with a ratio of about 2:1 being preferred.

The aromatic compound I acts as redox catalyst. Suitable for this purpose are naphthalene and in particular benzene, which each carry at least one, preferably two, or else up to four of the substituents X: amino, mono-$C_1$–$C_6$-alkylamino, such as monomethylamino, monoethylamino or monobutylamino, mercapto and in particular hydroxyl. They can also carry up to five substituents Y: halogen, such as chlorine and bromine, $C_1$–$C_6$-alkyl, such as methyl and ethyl, $C_1$–$C_6$-alkoxy, such as methoxy and ethoxy, and $C_1$–$C_6$-alkoxycarbonyl, such as methoxycarbonyl and ethoxycarbonyl. These substituents X and Y can be identical or different among themselves and their total number (m+n) should be $\leq$6.

Examples of suitable redox catalysts I include α- and in particular β-naphthol, 1,2-, 1,3- and 1,4-phenylenediamine, 2-, 3- and 4-aminophenol, o-, m- and p-cresol (2-, 3- and 4-methylphenol), preferably phenol, the trihydroxybenzenes pyrogallol (1,2,3) and phloroglucin (1,3,5) and particularly preferably the dihydroxybenzenes pyrocatechol (1,2), resorcinol (1,3) and in particular hydroquinone (1,4). It is of course also possible to use mixtures of these compounds.

The amount of redox catalyst I is generally from 1 to 25, preferably from 2 to 15, particularly preferably from 2 to 12, mol %, based on o-PDN.

Suitable for use as the inorganic base are in particular alkali metal hydroxides, oxides and carbonates and also their mixtures. Preference is given to potassium oxide, potassium carbonate and especially potassium hydroxide, lithium oxide, lithium carbonate and especially lithium hydroxide and particularly sodium oxide, sodium carbonate and especially sodium hydroxide.

It is particularly to be noted that, in contradistinction to many existing methods of preparation, the alkali metal is not incorporated into the phthalocyanine in the course of the process of the invention. Generally from 1 to 50, preferably from 2 to 25, mol % of inorganic base are used, based on o-PDN.

The reaction temperature is generally from 80° to 200° C., preferably from 100° to 200° C. If sodium or potassium oxide, carbonate or hydroxide is used, the temperature range from 140° to 180° C. is particularly preferred, while if lithium oxide, carbonate or hydroxide is used the temperature range from 100° to 180° C. is particularly preferred.

Generally β-phthalocyanine is formed, in particular in the glycol monoethers, at temperatures from 140° to 180° C., preferably from 160° to 175° C.

The formation of γ-phthalocyanine depends not only on the nature of the solvent but also on the reaction temperature. For instance, suitable temperatures range generally from 100° to 180° C., preferably from 140° to 170° C., in the case of the use of the glycols and from 100° to 150° C., preferably from 100° to 140° C., in the case of the glycol monoethers.

By adding seed crystals of the β or X form (usually from 0.1 to 2 mol %, based on o-PDN) it is possible to obtain, respectively, β- or X-phthalocyanine. The suitable way of preparing the X form comprises using in particular the glycol monoethers and temperatures from 140° to 180° C., preferably from 150° to 175° C.

The seed crystals for the X form can be phthalocyanine crystals obtained analogously to U.S. Pat. No. 3,357,989 or else by the process of the invention.

The preparation of π-phthalocyanine can be effected without or with the addition of seed crystals of the π-form. The inorganic base used is preferably lithium oxide or lithium carbonate and particularly preferably lithium hydroxide. The reaction is preferably carried out in glycols at temperatures from generally 100° to 180° C., preferably from 120° to 160° C.

The process of the invention thus offers the possibility of preparing in a specific manner whichever form of metal-free phthalocyanine is desired, simply by convenient variation of the reaction parameters.

A further advantage of the process is that it can be carried out under atmospheric pressure.

In detail the process of the invention can be carried out as follows. o-PDN and redox catalyst are dissolved in the solvent with or without heating. Then seed crystals (if necessary) and inorganic base, dissolved in the solvent or in the form of the solid, are added. The reaction mixture is then brought to the desired reaction temperature and held at that temperature until the o-PDN has been quantitatively consumed, which generally takes from 15 min to about 8 h and depends on the reaction temperature.

The reaction mixture can be worked up for the product, advantageously after cooling down to about 80°–100° C., by filtration, washing with the solvent used for the reaction or other alcohols such as methanol or ethanol and then, if desired, with water, and drying.

The process of the invention makes it possible to prepare metal-free phthalocyanines in the desired forms (β, γ, X and π) in high purity (without contamination by metal-containing phthalocyanines) and yield (up to 90%) in a specific manner. Also of particular advantage are the technical simplicity and the economy of the process, since it can be carried out under atmospheric pressure, inexpensive bases and redox catalysts can be used, and the solvent can be regenerated and used for further reactions.

EXAMPLES

Preparation of metal-free phthalocyanines ($H_2$-Pc) of the β, γ, X and π form x g of (chlorinated or chlorine-free) ortho-phthalodinitrile (o-PDN) and b g of the aromatic compound I were heated at $T_1$° C. with stirring in a g of the glycol G (after addition of y g of seed crystals of X- or π-phthalocyanine obtained analogously to Example 1 of U.S. Pat. No. 3,357,989 (X) or by the process of the invention (X or π) in the case of the preparation of X- or π-phthalocyanine). Following addition of c g of the inorganic base Z, in the form of the solid or dissolved in the glycol G, the mixture was additionally heated at $T_2$° C. for t h.

After cooling down to 80°–100° C., the product was filtered off, washed initially with the glycol G and then with water, and subsequently dried at 80°–100° C.

Details of these experiments and their results are summarized in the table below.

Key to abbreviations used:

BG ≙ ethylene glycol monobutyl ether

DG ≙ diethylene glycol

TG ≙ triethylene glycol

BDG ≙ diethylene glycol monobutyl ether

EDG ≙ diethylene glycol monoethyl ether

MDG ≙ diethylene glycol monomethyl ether

PE1 ≙ polyethylene glycol of average molecular weight 200

PE2 ≙ polyethylene glycol of average molecular weight 600

A ≙ hydroquinone

B ≙ phenol

C ≙ resorcinol

TABLE

| Ex. | x g of o-PDN (% by wt of Cl) | a g | Glycol G | b g | arom. comp. I | y g of $H_2$Pc seed crystals | $T_1$ [°C.] | c g | Base Z | $T_2$ [°C.] | t [h] | Yield [g]; crystal form |
|---|---|---|---|---|---|---|---|---|---|---|---|---|
| 1 | 75 (−) | 265 | BG | 1 | A | — | 165 | 0.5 | NaOH | 170 | 4 | 55; β-$H_2$Pc |
| 2 | 75 (−) | 265 | BG | 1 | A | — | 165 | 1.0 | NaOH | 170 | 4 | 59; β-$H_2$Pc |
| 3 | 75 (−) | 265 | BG | 2 | A | — | 165 | 6.0 | NaOH | 170 | 4 | 55; β-$H_2$Pc |

TABLE-continued

| Ex. | x g of o-PDN (% by wt of Cl) | a g | Gly-col G | b g | arom. comp. I | y g of $H_2Pc$ seed crystals | $T_1$ [°C.] | c g | Base Z | $T_2$ [°C.] | t [h] | Yield [g]; crystal form |
|---|---|---|---|---|---|---|---|---|---|---|---|---|
| 4 | 75 (—) | 265 | BG | 3 | A | — | 165 | 3.0 | NaOH | 170 | 4 | 61; β-$H_2Pc$ |
| 5 | 75 (—) | 265 | BG | 8 | A | — | 165 | 0.5 | NaOH | 170 | 4 | 59; β-$H_2Pc$ |
| 6 | 75 (—) | 265 | BG | 16 | A | — | 165 | 6.0 | NaOH | 170 | 4 | 58; β-$H_2Pc$ |
| 7 | 225 (—) | 470 | BG | 12.3 | A | — | 150 | 6.2 | NaOH | 165 | 3 | 198; β-$H_2Pc$ |
| 8 | 200 (—) | 270 | BG | 6.8 | A | — | 150 | 5.5 | NaOH | 175 | 3 | 156; β-$H_2Pc$ |
| 9 | 120 (—) | 240 | BG | 4.2 | B | — | 100 | 3.2 | NaOH | 160 | 4 | 75; β-$H_2Pc$ |
| 10 | 120 (—) | 240 | BG | 5 | C | — | 100 | 3.3 | NaOH | 160 | 4 | 84; β-$H_2Pc$ |
| 11 | 75 (—) | 265 | BG | 2 | A | — | 165 | 10.6 | $Na_2CO_3$ | 170 | 4 | 26; β-$H_2Pc$ |
| 12 | 75 (—) | 265 | BG | 4 | A | — | 165 | 6.9 | $K_2CO_3$ | 170 | 4 | 60; β-$H_2Pc$ |
| 13 | 130 (—) | 270 | BG | 7 | A | — | 165 | 6.0 | $K_2CO_3$ | 170 | 4 | 112; β-$H_2Pc$ |
| 14 | 46.6 (—) + 3.4(30.7) | 180 | BG | 0.7 | A | — | 150 | 1.4 | NaOH | 155 | 5 | 35; β-$H_2Pc$ (1.8% by wt of Cl) |
| 15 | 46.3 (—) + 3.7(27.6) | 180 | BG | 0.7 | A | — | 150 | 1.4 | NaOH | 155 | 5 | 34; β-$H_2Pc$ (2.3% by wt of Cl) |
| 16 | 120 (—) | 300 | DG | 5 | A | — | 100 | 3.3 | NaOH | 120 | 4 | 82; γ-$H_2Pc$ |
| 17 | 120 (—) | 440 | DG | 5 | A | — | 100 | 3.3 | NaOH | 180 | 4 | 83; γ-$H_2Pc$ |
| 18 | 120 (—) | 240 | TG | 5 | A | — | 100 | 3.3 | NaOH | 140 | 4 | 86; γ-$H_2Pc$ |
| 19 | 120 (—) | 240 | TG | 5 | A | — | 100 | 3.3 | NaOH | 160 | 4 | 88; γ-$H_2Pc$ |
| 20 | 120 (—) | 440 | PE1 | 5 | A | — | 100 | 3.3 | NaOH | 160 | 4 | 89; γ-$H_2Pc$ |
| 21 | 120 (—) | 340 | PE2 | 5 | A | — | 100 | 3.3 | NaOH | 140 | 4 | 88; γ-$H_2Pc$ |
| 22 | 120 (—) | 240 | BG | 5 | A | — | 100 | 4.6 | KOH | 120 | 4 | 77; γ-$H_2Pc$ |
| 23 | 120 (—) | 240 | BDG | 5 | A | — | 100 | 3.3 | NaOH | 140 | 4 | 95; γ-$H_2Pc$ |
| 24 | 120 (—) | 290 | EDG | 5 | A | — | 100 | 3.3 | NaOH | 140 | 4 | 95; γ-$H_2Pc$ |
| 25 | 120 (—) | 240 | BG | 5 | A | — | 100 | 3.3 | NaOH | 160 | 4 | 102; β-$H_2Pc$ (95%) |
| 26 | 120 (—) | 240 | MDG | 5 | A | — | 100 | 3.3 | NaOH | 180 | 4 | 99; β-$H_2Pc$ (93%) |
| 27 | 120 (—) | 390 | EDG | 5 | A | — | 100 | 3.3 | NaOH | 180 | 4 | 99; β-$H_2Pc$ |
| 28 | 60 (—) | 200 | MDG | 2.5 | A | — | 120 | 2.3 | KOH (in 40 ml of G) | 120 | 4 | 33; γ-$H_2Pc$ |
| 29 | 30 (—) | 200 | MDG | 1.3 | A | — | 160 | 1.2 | KOH (in 40 ml of G) | 160 | 4 | 16; β→γ-$H_2Pc$ |
| 30 | 120 (—) | 240 | MDG | 5 | A | 1.2; X | 100 | 3.3 | NaOH | 166 | 4 | 96; X-$H_2Pc$ |
| 31 | 120 (—) | 240 | MDG | 5 | A | 0.6; X | 100 | 3.3 | lNaOH | 163 | 4 | 97; X-$H_2Pc$ |
| 32 | 120 (—) | 240 | MDG | 5 | A | 0.3; X | 100 | 3.3 | NaOH | 163 | 4 | 97; X-$H_2Pc$ |
| 33 | 120 (—) | 240 | BG | 5 | A | 2.4; X | 100 | 3.3 | NaOH | 160 | 4 | 101; X-$H_2Pc$ |
| 34 | 120 (—) | 240 | MDG | 5 | JA | 2.4; X | 100 | 1.65 | KOH | 160 | 4 | 74; X-$H_2Pc$ |
| 35 | 120 (—) | 240 | MDG | 5 | A | 2.4; X | 100 | 3.3 | NaOH | 180 | 4 | 74; X-$H_2Pc$ |
| 36 | 120 (—) | 240 | BG | 5 | A | — | 100 | 2 | LiOH | 160 | 4 | 102; β-$H_2Pc$ |
| 37 | 120 (—) | 240 | BG | 5.7 | E | — | 100 | 2 | LiOH | 160 | 4 | 95; β-$H_2Pc$ |
| 38 | 120 (—) | 240 | BG | 5 | A | — | 100 | 2 | LiOH | 175 | 4 | 105; β-$H_2Pc$ |
| 39 | 120 (—) | 400 | DG | 5 | A | — | 100 | 2 | LiOH | 100 | 4 | 93; γ-$H_2Pc$ |
| 40 | 120 (—) | 400 | DG | 5 | A | — | 100 | 2 | LiOH | 120 | 4 | 98; γ-$H_2Pc$ |
| 41 | 120 (—) | 400 | DG | 5.7 | E | — | 100 | 2 | LiOH | 120 | 4 | 88; π-$H_2Pc$ |
| 42 | 120 (—) | 400 | DG | 5.7 | E | — | 100 | 2 | LiOH | 160 | 4 | 89; π-$H_2Pc$ |
| 43 | 120 (—) | 400 | DG | 5.7 | D | — | 100 | 2 | LiOH | 120 | 4 | 96; π-$H_2Pc$ |
| 44 | 120 (—) | 240 | MDG | 5 | A | — | 100 | 2 | LIOE | 120 | 4 | 47; π→X-$H_2Pc$ |
| 45 | 120 (—) | 240 | MDG | 5 | A | — | 100 | 2 | LiOH | 160 | 4 | 94; π→X-$H_2Pc$ |
| 46 | 120 (—) | 240 | MDG | 5.7 | D | — | 100 | 2 | LiOH | 160 | 4 | 76; X-$H_2Pc$ |
| 47 | 120 (—) | 400 | DG | 5 | A | 2.4; π | 100 | 2 | LiOH | 120 | 4 | 101; π-$Hc_2Pc$ |
| 48 | 120 (—) | 400 | DG | 5 | A | 2.4; π | 100 | 2 | LiOH | 160 | 4 | 100; π-$H_2Pc$ |
| 49 | 120 (—) | 400 | DG | 5.7 | D | 0.3; π | 100 | 2 | LiOH | 120 | 4 | 96; π-$H_2Pc$ |
| 50 | 120 (—) | 400 | DG | 5 | D | 0.3; π | 100 | 2 | LiOH | 160 | 4 | 96; π-$H_2Pc$ |

We claim:

1. A process for preparing metal-free phthalocyanines which can carry up to 16 halogen atoms, cyano groups, carboxyl groups, sulfo groups, $C_1$–$C_{18}$-alkyl groups and aryl radicals as substituents by reductive cyclization of ortho-phthalodinitrile, substituted ortho-phthalodinitriles or mixtures thereof, which comprises effecting the cyclization in $C_2$–$C_4$-alkylene monoglycols, oligoglycols or polyglycols, their mono-$C_1$–$C_8$-alkyl or -aryl ethers or their mixtures in the presence of an aromatic compound acting as a redox catalyst of the formula I

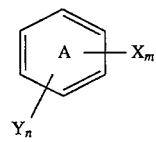

where the substituents X can be identical or different and each denotes hydroxyl, mercapto, amino or $C_1$–$C_6$-alkylamino, the substituents Y can likewise be identical or different and each denotes halogen, $C_1$–$C_6$-alkyl, $C_1$–$C_6$-alkoxy or $C_1$–$C_6$-alkoxycarbonyl, m is from 1 to 4 and n is from 0 to 5, subject to the proviso that m+n≦6, and the benzene ring A can be fused to a further benzene ring,
and of an inorganic base.

2. A process as claimed in claim 1, wherein the cyclization is carried out in $C_2$–$C_3$-alkylene monoglycols, oligoglycols or polyglycols or their mono-$C_1$–$C_4$-alkyl or monoaryl ethers.

3. A process as claimed in claim 1, wherein the aromatic compound (I) is a hydroxybenzene.

4. A process as claimed in claim 1, wherein the aromatic compound (I) is a dihydroxybenzene.

5. A process as claimed in claim 1, wherein the inorganic base used is an alkali metal hydroxide, oxide, carbonate or mixture thereof.

6. A process as claimed in claim 1, wherein the cyclization is carried out at from 80° to 200° C.

7. A process as claimed in claim 1, for preparing unsubstituted metal-free phthalocyanine.

* * * * *